Figure 1:
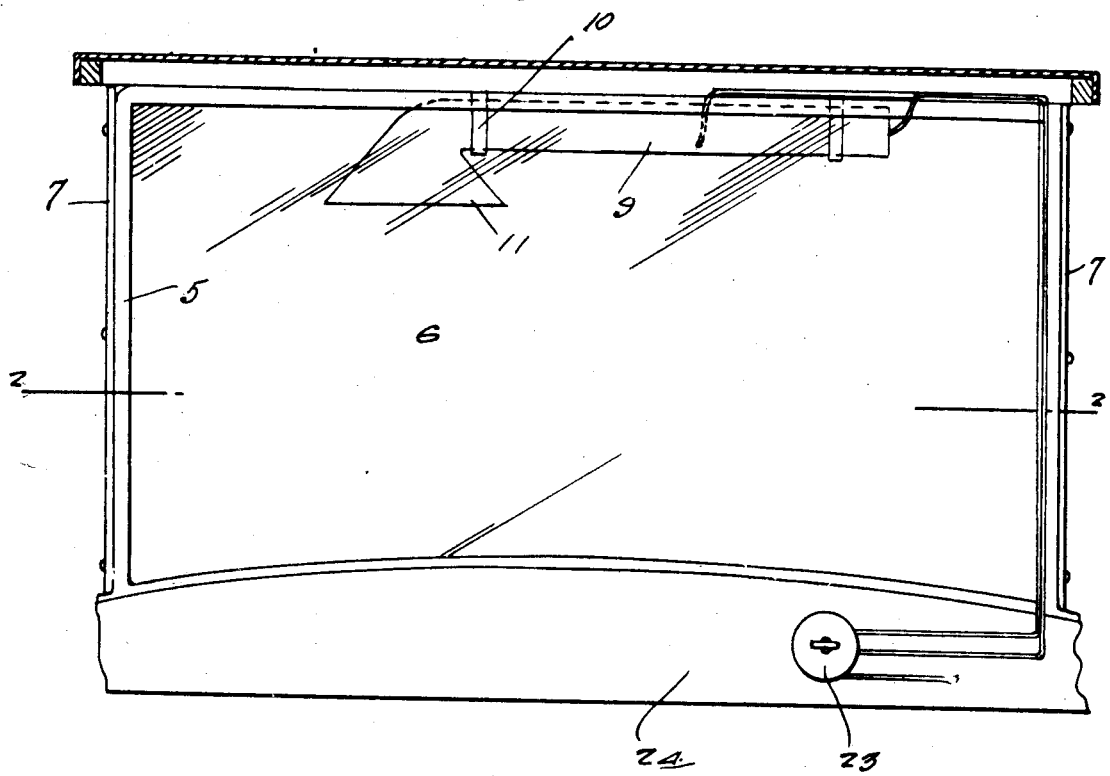

Dec. 15, 1931.    C. J. DAMM    1,836,649
WINDSHIELD ATTACHMENT
Filed Jan. 31, 1930    2 Sheets-Sheet 1

Inventor
Clement J. Damm

By Clarence A. O'Brien
Attorney

Dec. 15, 1931.   C. J. DAMM   1,836,649
WINDSHIELD ATTACHMENT
Filed Jan. 31, 1930   2 Sheets-Sheet 2
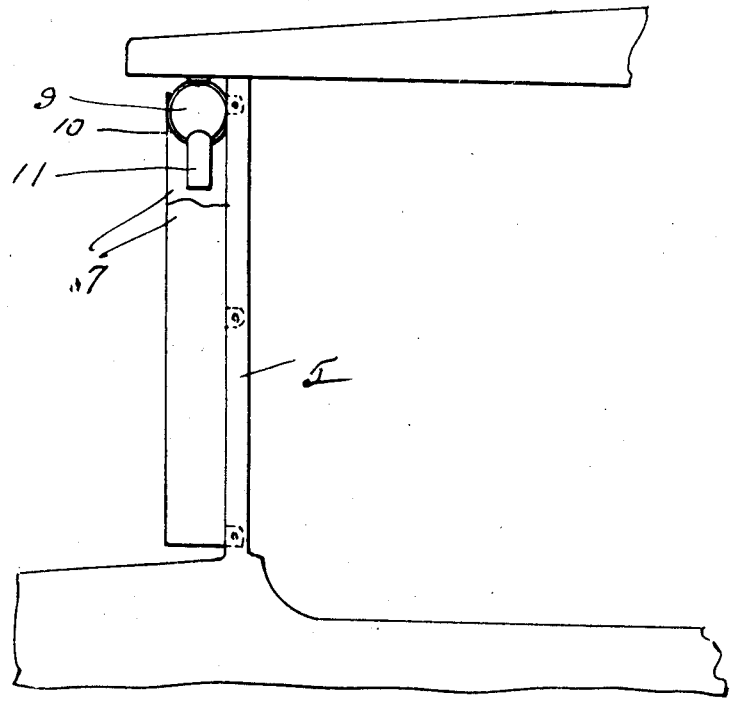
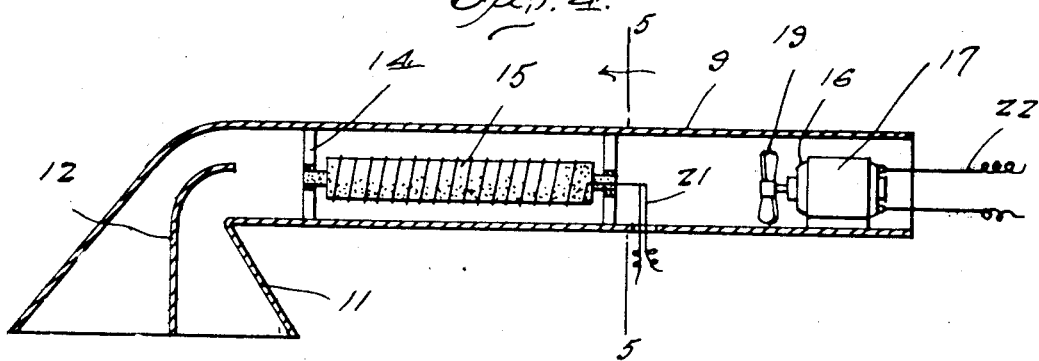
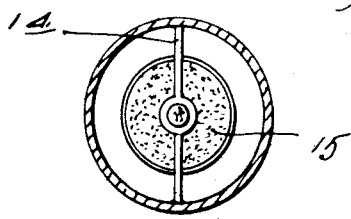
Inventor
Clement J. Damm
By Clarence A. O'Brien
Attorney Patented Dec. 15, 1931

1,836,649

UNITED STATES PATENT OFFICE

CLEMENT J. DAMM, OF SIOUX FALLS, SOUTH DAKOTA

WINDSHIELD ATTACHMENT

Application filed January 31, 1930. Serial No. 424,936.

The present invention relates to a windshield attachment and has for its prime object to provide a hot air heater for forcing the heated air against the outside of the windshield glass to maintain the same warm and prevent snow, sleet, rain, and frost from collecting on the glass.

Another very important object of the invention resides in the provision of an attachment of this nature which is exceedingly simple in its construction, easy to install, compact and convenient, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
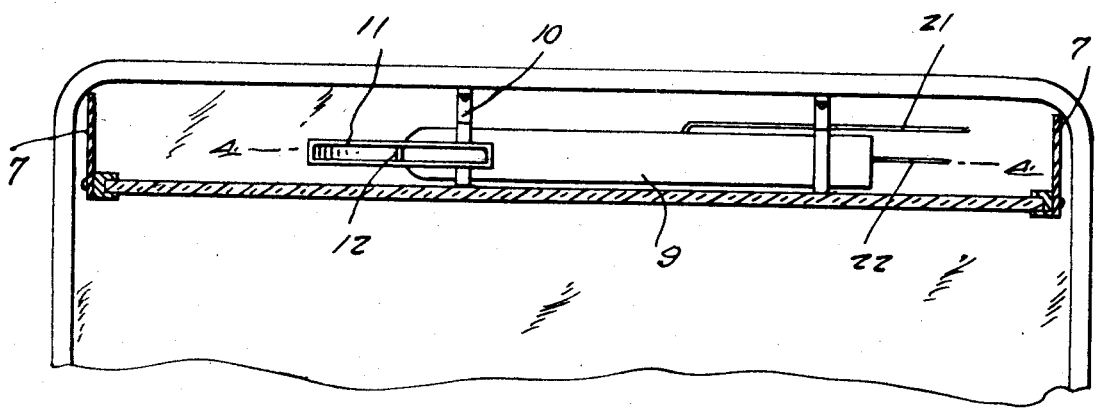

In the drawings:

Figure 1 is a rear elevation of a windshield showing my attachment mounted in place, Figure 2 is a horizontal section taken substantially on the line 2—2 of Figure 1, looking upwardly, Figure 3 is a side elevation of a part of one of the side shields being broken away, Figure 4 is a detail section taken substantially on the line 4—4 of Figure 2, and Figure 5 is a sectional view taken substantially on the line 5—5 of Figure 4.

Referring to the drawings in detail it will be seen that the numeral 5 denotes the frame of a windshield with the usual glass panel 6 mounted therein. A pair of shield plates 7 are fixed to the sides of the frame 5 and project forwardly. A tubular member 9 is mounted on the top rail of the frame 5 in any suitable or preferred manner such as by means of clamp brackets 10 so as to be supported in a horizontal position and at one end terminates in a depending funnel 11 which flares downwardly and has therein a baffle partition 12.

Brackets 14 in the tube 9 adjacent the funnel 11 support an electric heating element 15. An electric motor 16 is supported in a suitable bracket 17 within the other end of the tube 9 and has a fan 19 on the inner end of the armature shaft thereof.

Wires 21 and 22 lead from the element 15 and the motor 16 to a switch 23 on the dash board or instrument board 24 so that both elements 15 and 16 may be energized simultaneously.

From the above detailed description it will be seen that in rainy, snowy, sleety or like weather the switch 23 may be turned on so as to create a current of air through the tube 9 over and past the electric heating element 15 so that the air will be heated and forced down and spread by the funnel 11 and its baffle partition 12 on to the outside of the glass panel 6 and this heated air will be confined to a great extent to the panel 6 by means of the plate shields 7.

In this way it will be seen that sleet, moisture, snow, etc., will be prevented from collecting on the windshield.

It will be noted that the funnel 11 is located adjacent the left hand side of the windshield in front of the driver's seat. Of course if a right hand drive is provided this would be reversed.

It is thought that the construction, utility, operation and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In combination a vehicle having a cowl, and a projecting front portion at the top thereof, and a windshield including a frame and a single transparent member, a pair of forwardly extending and vertically arranged plates attached to the vertical side members of the frame and extending from a point slightly above the cowl to a point slightly below the projecting front portion of the top of the vehicle, and means for introducing heated air into the space formed by the windshield and said plate.

In testimony whereof I affix my signature.

CLEMENT J. DAMM.